United States Patent
Schwartz et al.

[11] Patent Number: 6,085,965
[45] Date of Patent: Jul. 11, 2000

[54] PRESSURE BONDING AND DENSIFICATION PROCESS FOR MANUFACTURING LOW DENSITY CORE METAL PARTS

[75] Inventors: Daniel S. Schwartz, University City; Donald A. Deuser, Florissant; Rick L. Martin, St. Peters, all of Mo.

[73] Assignee: McDonnel & Douglas Corporation, St. Louis, Mo.

[21] Appl. No.: 08/794,835

[22] Filed: Feb. 4, 1997

[51] Int. Cl.$^7$ .......................... B23K 20/02; B23K 20/233
[52] U.S. Cl. .......................... 228/190; 228/205; 228/221; 228/235.1
[58] Field of Search .................................. 428/613, 654; 228/190, 205, 221, 234.1, 235.1

[56] References Cited

U.S. PATENT DOCUMENTS

| | | | |
|---|---|---|---|
| 3,609,855 | 10/1971 | Schmidt | 29/471.1 |
| 3,703,763 | 11/1972 | Berry | 228/172 |
| 3,834,881 | 9/1974 | Niebylski | 428/613 |
| 3,873,392 | 3/1975 | Niebylski et al. | 156/306 |
| 4,087,037 | 5/1978 | Schier et al. | 228/106 |
| 4,252,263 | 2/1981 | Houston | 228/193 |
| 4,315,591 | 2/1982 | Houston | 228/188 |
| 4,907,736 | 3/1990 | Doble | 228/190 |
| 5,024,368 | 6/1991 | Bottomley et al. | 228/118 |
| 5,174,143 | 12/1992 | Martin | 72/53 |
| 5,253,796 | 10/1993 | Stacher et al. | 228/193 |
| 5,482,533 | 1/1996 | Masuda et al. | 428/613 |
| 5,564,064 | 10/1996 | Martin | 419/5 |

FOREIGN PATENT DOCUMENTS 63-076758  7/1988  Japan .

OTHER PUBLICATIONS

V.N. Chudin et al., Technology of combined deformation and diffusion bonding laminated, load–bearing constructions, *Welding International* (no month) 1996, 10 (3) 224–227.

High–Temperature Solid–State Welding, W. Lehrheuer, ASM Handbook, vol. 6, Welding, Brazing, and Soldering, Dec. 1993.

*Primary Examiner*—John J. Zimmerman
*Attorney, Agent, or Firm*—Alston & Bird LLP

[57] ABSTRACT

A novel method of forming low density core metal parts by pressure bonding face sheets to a porous foam metal core and simultaneously densifying the core is disclosed. In particular, low density core aluminum and aluminum alloy parts can be formed according to the method of the invention. The method of forming low density core metal parts generally comprises the steps of providing a porous, foam metal core and simultaneously pressure bonding first and second solid metal face sheets directly to opposite sides of the core and densifying the core by applying heat and uniaxial forge pressure to the first and second face sheets and to the core for a predetermined period of time. The method of the invention can therefore produce LDC parts having a predetermined shape and density. Furthermore, the LDC parts are less subject to interfacial oxidation and delamination than conventional LDC parts made by brazing.

14 Claims, 2 Drawing Sheets

PRESSURE BONDING AND DENSIFICATION PROCESS FOR MANUFACTURING LOW DENSITY CORE METAL PARTS

GOVERNMENT RIGHTS

The United States Government may have rights in this invention pursuant to a contract awarded by the Department of the Navy.

BACKGROUND OF THE INVENTION

The present invention relates to structural parts and to methods of forming low density core parts and, more particularly, to low density core metal parts and methods of simultaneously pressure bonding low density core metal parts and densifying the core material to provide low density core metal parts having a predetermined density and shape.

Metallic composites or sandwich structures have been used in a number of applications. These structures generally involve the bonding of two or more metal layers using various bonding techniques. These techniques involve either directly bonding the metal layers to one another using heat and sometimes pressure or involve using other materials to facilitate bonding between the metal layers.

One common method of forming metallic sandwich structures involves diffusion bonding or high-temperature solid-state welding. As described in W. Lehrheuer, *High-Temperature Solid-State Welding*, ASM Handbook, vol. 6 (1993), diffusion bonding is used to join layers of similar or dissimilar materials by compressing and heating the surfaces to be joined in a suitable atmosphere and maintaining the temperature and pressure until the layers are joined. Diffusion bonding results in the direct bonding of metal layers and is normally characterized by the interchange of metal molecules or diffusion of molecules at the interface of the two metal layers being bonded. Generally, diffusion bonding processes involve relatively high temperatures and low pressures which are maintained over several hours.

Diffusion bonding is also often coupled with superplastic forming in the formation of the metal structures. Superplasticity is the characteristic of certain metals to develop unusually high tensile elongations with minimum necking when deformed within a limited temperature and strain rate range. Generally, superplastic forming processes include the injection of an inert gas into the sandwich structure during its formation to facilitate superplastic forming of the structure. One example of a diffusion bonding and superplastic forming process is U.S. Pat. No. 5,024,368 to Bottomley et al. Bottomley et al. describes the diffusion bonding and superplastic forming of components made from aluminum or aluminum alloys using a temperature of about 560° C. and a pressure of 1000 psi for about 3 hours. Additionally, U.S. Pat. No. 5,253,796 to Stacher et al. describes forming a titanium aluminide sandwich structure using diffusion bonding and superplastic forming at a temperature of 1800° F. (980° C.).

A second common method of forming composite structures is hot isostatic pressing or "hipping". In hot isostatic pressing, a generally fluid tight composite structure is compressed by applying fluid pressure to the outside of the structure. Hot isostatic pressing occurs at very high temperatures (600° C. to 1000° C. and higher) and pressures (15 ksi) and is normally used to densify the composite structure. For example, U.S. Pat. No. 4,907,736 to Doble describes hot isostatic pressing to form a structural composite comprising metal and filamentary layers.

A third method of forming metallic structures is pressure bonding or forge welding. Pressure bonding involves actual deformation of the composite structure using relatively low temperatures and relatively high pressures. As described in W. Lehrheuer, *Forge Welding*, ASM Handbook, vol. 6 (1993), pressure bonding involves applying pressure to press the layers to be bonded together, heating the interface between the layers, and increasing the pressure to upset the interface. Pressure bonding has been used in various applications to form solid metal articles including rods, bars, tubes, rails, aircraft landing gear, chains and cans.

In addition to these methods, other methods such as soldering and brazing are used to bond metal layers to form composite structures but involve the use of additional adhesive substances which are placed between the metal layers to provide indirect bonding therebetween. Soldering involves the use of a low-melting alloy (below 800° F. or 427° C.) which acts as an adhesive but does not form an intermetallic solution with the metals being joined. Brazing is similar to soldering but the filler alloy has a higher melting temperature (above 840° F. or 450° C.). In both soldering and brazing, the alloy is placed between the edges or ends of the metal layers to be bonded and heated to form a bond between the metal layers.

In various industries, low density core (LDC) metal parts, such as honeycomb, foam core, and porous structural parts, have been used to provide lightweight alternatives to solid metal structures. The structures built from these lightweight parts can, like solid metal structures, carry high structural loads, withstanding bending, buckling and compression. For example, these lightweight structures have found utility in the aerospace industry, in the ship building industry, in medical devices, and in commercial applications such as in filtration, heat exchangers, electrochemical cells, heat pipes, and pumps. LDC parts are particularly effective in aerospace applications which are buckling and crippling limited, where the LDC parts need to withstand lateral pressure without buckling or crippling, e.g., wing skins, flap skins, and bulkheads. In particular, aluminum and aluminum alloy parts have found utility for these applications.

Conventional methods of forming LDC metal parts involve brazing metal face sheets to a metal core material. Nevertheless, brazing does not allow for the adjustment of the core density, especially when metallic foams are used as the core material. Furthermore, because brazing does not form a direct bond, LDC parts which are formed by brazing are subject to delamination which may be caused by interfacial oxidation. As a result, LDC parts formed by brazing may have a low degree of structural stability. Further disadvantages are described in U.S. Pat. No. 5,174,143 to Martin, which is commonly owned by the assignee of the present application. For example, bond inconsistencies and the infeasability of forming thin section parts are also disadvantages of conventional brazing methods.

Alternative direct bonding methods such as diffusion bonding and hot isostatic pressing have proven ineffective in forming LDC metal parts, specifically, foam aluminum and aluminum alloy core parts. In particular, these methods either do not allow for effective densification of the foam core material or do not provide a method of controlling the final foam core density. Furthermore, aluminum readily oxidizes to form aluminum oxide which impairs the ability of the aluminum to diffusion bond with other metal layers. Therefore, the aluminum structures must be extensively deoxidized immediately before bonding to form effective bonds.

SUMMARY OF THE INVENTION

The present invention provides a novel method of forming LDC parts by pressure bonding which allows for the simultaneous densification of the core material. According to the method of the invention, foam core metal LDC parts and, in particular, foam aluminum and aluminum alloy core parts, can be formed. The method of the invention can produce LDC parts having a predetermined shape and density. In addition, the LDC parts are less subject to interfacial oxidation and delamination. Furthermore, the LDC parts according to the invention possess the advantages of both conventional solid metal structures and sandwich metal structures, including a high degree of structural stability.

The method of forming low density core metal parts generally comprises the steps of providing a porous, foam metal core material and simultaneously pressure bonding solid metal face sheets directly to opposite sides of the core and densifying the core. Preferably, the foam core comprises a material selected from the group consisting of aluminum and aluminum alloys. In addition to the core material, the face sheets may also be formed of aluminum or aluminum alloys to form a LDC part which is entirely constructed of aluminum or aluminum alloy material. The simultaneous pressure bonding and densification step includes the application of heat and uniaxial forge pressure to the face sheets for a predetermined period of time. Typically, the simultaneous pressure bonding and densification step comprises applying heat at a temperature of between about 350° C. and 500° C. and pressure at up to about 1 ksi for between about 5 and 60 minutes. The resulting core is generally densified to less than about 50% its original thickness. The method of the invention can therefore produce LDC metal parts having a predetermined shape and density.

The present invention further includes a low density core metal part comprising a porous, foam metal core material; a first solid metal face sheet pressure bonded directly to the core on one side thereof; and a second solid metal face sheet pressure bonded directly to the core on a side opposite that of the first face sheet. In addition to the first and second face sheets, the LDC part may include one or more additional face sheets to form the LDC parts of the invention.

Advantageously, the method of forming low density core metal parts using a simultaneous pressure bonding and densification step provides a low cost and effective way to produce LDC parts. The method of forming low density core metal parts and the resulting LDC parts may also possess a stronger bond between the face sheets and the foam core than in conventional brazing and soldering processes. Therefore, the metallic bonds are less likely to be subject to interfacial oxidation and delamination. In addition, simultaneously pressure bonding the face sheets to the core and densifying the core allows for greater control of the final core density.

DETAILED DESCRIPTION OF THE INVENTION

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
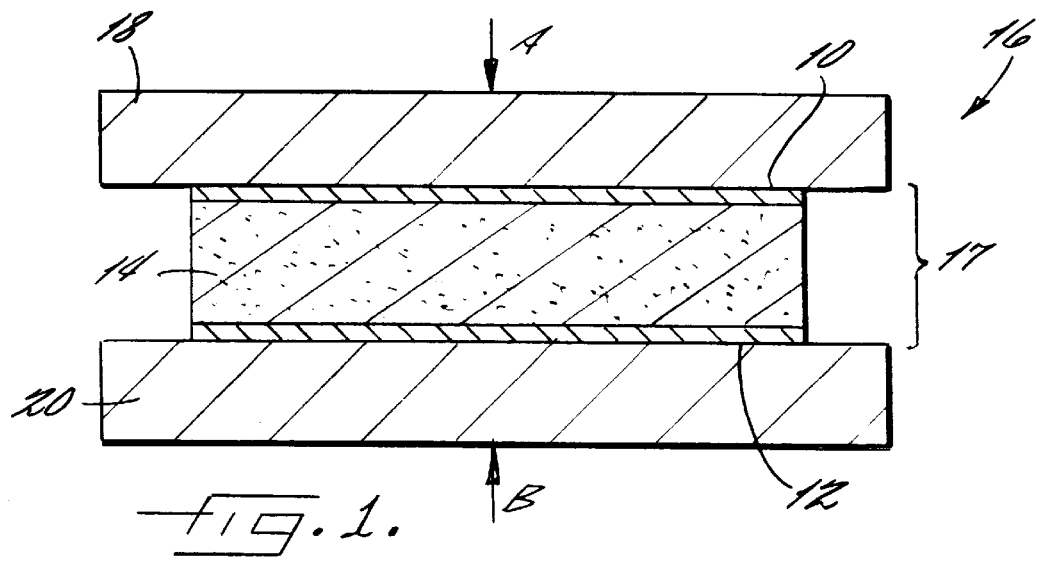
FIG. 1 is a side view of a hot press used in the formation of LDC parts according to one embodiment of the invention.

Referring now to FIG. 1, a first face sheet 10, a second face sheet 12, and a core 14 are illustrated. The face sheets 10 and 12 are preformed and correspond generally in shape to the LDC part to be manufactured therefrom. In FIG. 1, the face sheets 10 and 12 have a generally planar surface. Nevertheless, as discussed hereinbelow, the face sheets 10 and 12 may have any shape and may have curved or patterned surfaces depending on the final shape of the LDC part to be manufactured therefrom. The face sheets 10 and 12 are constructed of solid metal and may be formed of various metals and metal alloys. For example, the face sheets 10 and 12 may be formed of aluminum, copper or titanium, or alloys containing these metals. The face sheets 10 and 12 are advantageously formed of materials which will bond to the foam core 14. For example, the face sheets 10 and 12 and the foam core 14 may be of the same material. Preferably, the face sheets 10 and 12 are formed of aluminum or aluminum alloys. The aluminum alloys may consist of aluminum alloyed with zinc, copper or magnesium.

The core 14 used in forming the LDC parts of the invention is a porous, metal foam material such as aluminum, copper, or titanium. Preferably, the core 14 is a porous metal foam formed of aluminum or aluminum alloys. As described above, the aluminum may be alloyed with zinc, copper or magnesium. Suitable aluminum and aluminum alloy foams having various densities are available, e.g., from Energy Research and Generation, Inc. in Oakland, Calif. or Cymat Aluminum Corp. in Mississauga, Ontario. The core 14 may be of any suitable shape but preferably conforms to the shape of the face sheets 10 and 12 to thereby provide better post-formed homogeneity of the porous core. Typically, prior to the application of heat and pressure, the core 14 has a specified density and thickness. The specified density may be measured as a percentage based on the density of the corresponding solid (non-foamed) metal, i.e., solid aluminum for an aluminum foam core.

Additionally, the density of the foam core 14 may be measured by the porosity or void volume of the foam core which is directly related to the density percentage of the foam core (i.e., 100%–density %=porosity %). Preferably, in the present invention, the initial density of the foam core 14 is between about 5 and 25 percent the density of the solid metal. Therefore, the initial porosity of the foam core 14 is between about 75 and 95 percent.

As illustrated in FIG. 1, the foam core 14 is placed between the face sheets 10 and 12 and in direct contact with the face sheets, i.e. without the addition of soldering or brazing compositions, in a suitable apparatus such as hot press 16. The face sheets 10 and 12 and foam core 14 form a sandwich structure 17. Because of the porosity of the foam core 14, face sheets 10 and 12 contact the foam core at a plurality of contact points (typically $10^5$ to $10^7$ contacts/m$^2$). Generally, prior to placing the foam core 14 and the face sheets 10 and 12 in direct contact, the core and particularly, the face sheets may be cleaned and degreased to remove any oxidants or other contaminants present on the surface of the face sheets and the core. The core 14 and face sheets are cleaned and degreased by methods known to those skilled in the art, e.g., using various commercial solvents such as acetone or alcohols. Nevertheless, these oxidants generally do not affect the pressure bonding of the core 14 to the face sheets 10 and 12 and thus the deoxidation of these surfaces does not have to be as complete as for surfaces involved in diffusion bonding where the presence of oxidants greatly affects the bond between the metal layers.

As illustrated in FIG. 1, the hot press 16 may be generally rectangular, but may also be cylindrical or any other shape which is useful in forming the particular LDC part. The hot press 16 comprises an upper metallic plate 18 and a lower metallic plate 20 which are in direct contact with the adjacent face sheets, for example in FIG. 1, face sheets 10 and 12, respectively. As shown in the LDC part in FIG. 4, the sandwich structure 17 may include one or more additional face sheets 24 and 26, which may be in direct contact with the plates 18 and 20 during formation of the LDC part. The metallic plates 18 and 20 are generally formed of a material such as stainless steel which will not readily bond to the adjacent face sheets.

In the operation of the hot press 16 to pressure bond the first and second face sheets 10 and 12 to the core 14 and to simultaneously densify the core, the sandwich structure 17 is placed in an inert environment such as argon gas or in a vacuum evacuated to a pressure of less than about $10^{-6}$ torr. The hot press 16 is then preferably heated to a temperature between about 350° C. and 500° C. (e.g. 450° C.). A hydraulic piston (not shown) pushes down in direction A to subject the sandwich structure 17 to uniaxial forge pressure of preferably between about 0.5 and 1 ksi. The uniaxial forge pressure forces the face sheets 10 and 12 into the core 14 in the direction of arrows A and B and thereby compresses the core. In particular, the applied uniaxial forge pressure is concentrated at the contact points on the surface of the foam core 14, thereby causing greater deformation at these points of the core than seen by the bulk of the foam core. This highly localized deformation at the interface between the face sheets 10 and 12 and the core 14 provides a strong face sheet to core bond. Furthermore, in the compression of the sandwich structure 17, there is little or no deformation of the face sheets 10 and 12 because of the compressibility of the foam core 14. Therefore, the foam core 14 can be readily compressed to correspond to the shape of the face sheets 10 and 12.

Figure 3:
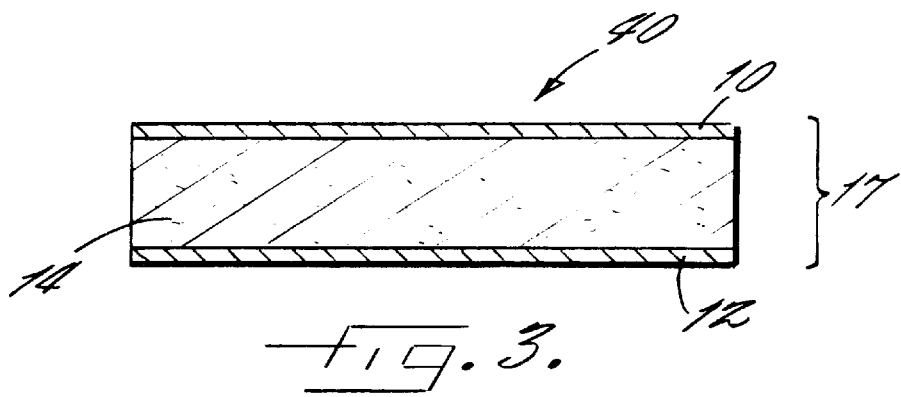
FIG. 3 is a cross-sectional view of a LDC part having a generally rectangular shape which is formed according to the invention.

The sandwich structure 17 is subjected to the temperatures and pressures described above until the compressed foam core 14 has reached a predetermined density. Preferably, the sandwich structure 17 is maintained at this temperature and pressure for between about 5 and 60 minutes. Although the temperatures, pressures and time periods described above are preferred, lower temperatures (below 350° C.) may be used and, in this event, the process may occur for longer periods of time. Generally, the foam core is densified to no more than about 50 percent of its original thickness. For example, a foam core 14 having an initial density of from 5 to 25 percent (a porosity of 75 to 95 percent) might be compressed to a density of 50 to 70 percent (a porosity of 30 to 50 percent). Although a rectangular LDC part 17 is illustrated in FIG. 3, the LDC can have other shapes if desired.

As will be understood to one skilled in the art, the temperatures used in pressure bonding are relatively lower and the pressures (especially as they are applied to the foam) relatively higher than those used for diffusion bonding the same material (e.g., U.S. Pat. No. 5,024,368 to Bottomley et al.). Because the core 14 is a porous, foam structure, the pressure applied to the face sheets 10 and 12 and therefore to the surface of the core is concentrated along the contact points between the core and the face sheets. Therefore, a pressure of, for example, 1 ksi (1000 pounds per square inch) applied to the face sheet 10 will result in the application to a foam core 14 having a density of 15 percent of the corresponding solid metal density, of a pressure of about 6.7 ksi initially to the surface of the foam core. Therefore, the actual pressures to which the foam is subjected are greater than those used in diffusion bonding.

Figure 2:
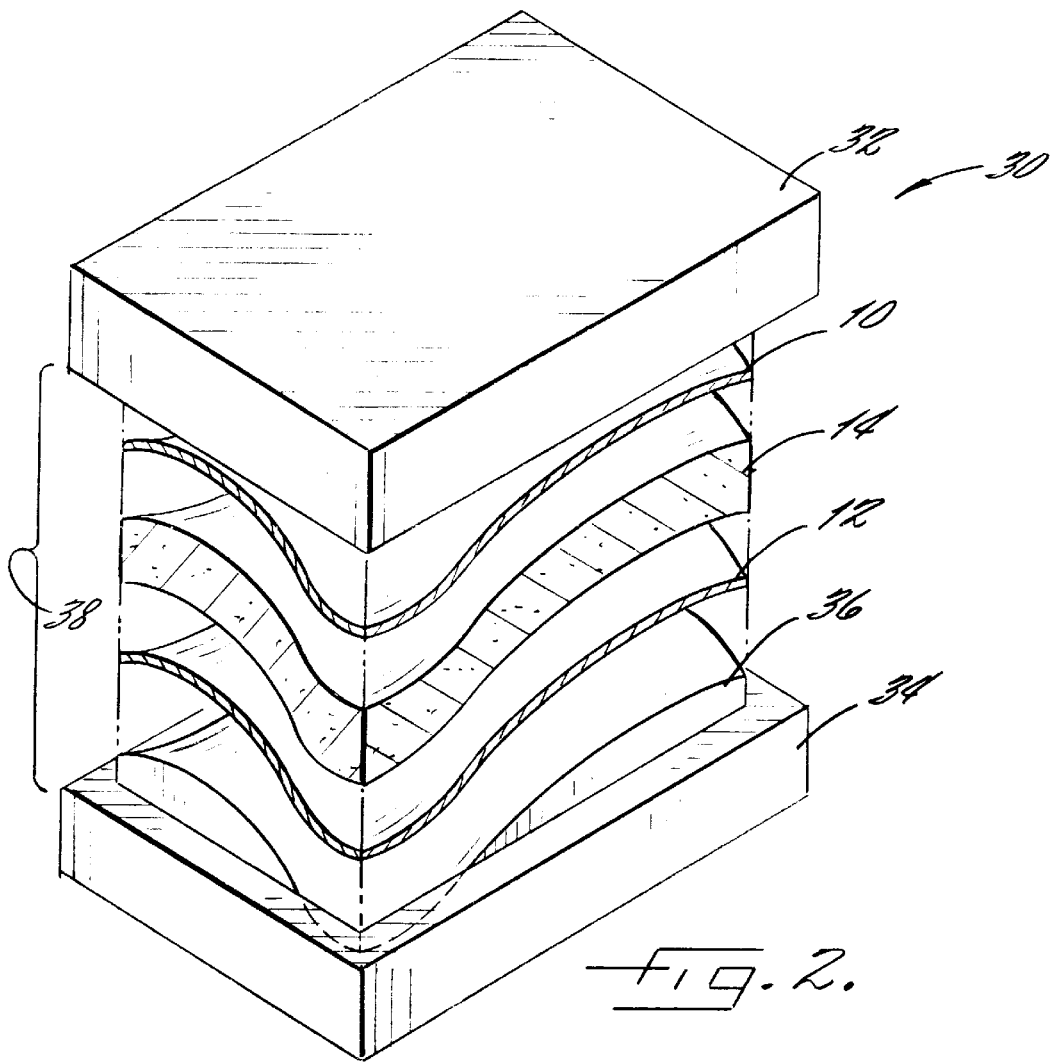
FIG. 2 is an exploded view of a forming die for the formation of LDC parts having a predetermined shape according to one embodiment of the invention.

As an alternative to pressure bonding the first and second face sheets 10 and 12 to the core 14 and simultaneously densifying the core in the hot press 16, the sandwich structure may also be vacuum bagged and placed in a steel envelope by known methods and thereafter placed in a hot forge to pressure bond the face sheets 10 and 12 to the foam core 14 and to densify the core 14. Additionally, as illustrated in FIG. 2, the face sheets 10 and 12 and foam core 14 may be placed in a forming die 30 to form the LDC parts of the invention. The forming die 30 may be preferred especially when the LDC part being formed is of an irregular shape such as those illustrated in FIGS. 4 and 5.

As illustrated in FIG. 2, the face sheets 10 and 12 and the foam core 14 are oriented in direct contact with one another in the forming die 30. The face sheets 10 and 12 are provided in a shape generally corresponding to the desired shape for the LDC part. As shown in FIG. 2, the forming die 30 includes upper and lower plates 32 and 34 which define a cavity 38 having a shape which corresponds to the predetermined shape of the LDC part being formed therein. For example, each plate can include a curved profile plate, e.g., 36 for the lower plate, which defines a shape corresponding to the shape of the LDC part. The curved profile plates can be defined by the inner surfaces of the respective upper and lower plates 32 and 34 so as to be integral therewith. Alternatively, the curved profile plates can be separate plates which are mounted upon or otherwise supported by the respective upper and lower plates 32 and 34. The foam core 14 may also be shaped to correspond to the face sheets 10 and 12 or, because the foam core may be readily deformed, the foam core may have another shape such as a generally planar shape as illustrated in FIG. 1. Once the face sheets 10 and 12 and the foam core 14 are placed in the forming die 30, the forming die can be flushed with an inert gas and evacuated, typically to a pressure less than $10^{-6}$ torr. Depending upon the shape imparted by the forming die 30, the resulting LDC part can thereafter be formed into a wide variety of structurally useful shapes including contoured and rib-stiffened geometries.

Figure 4:
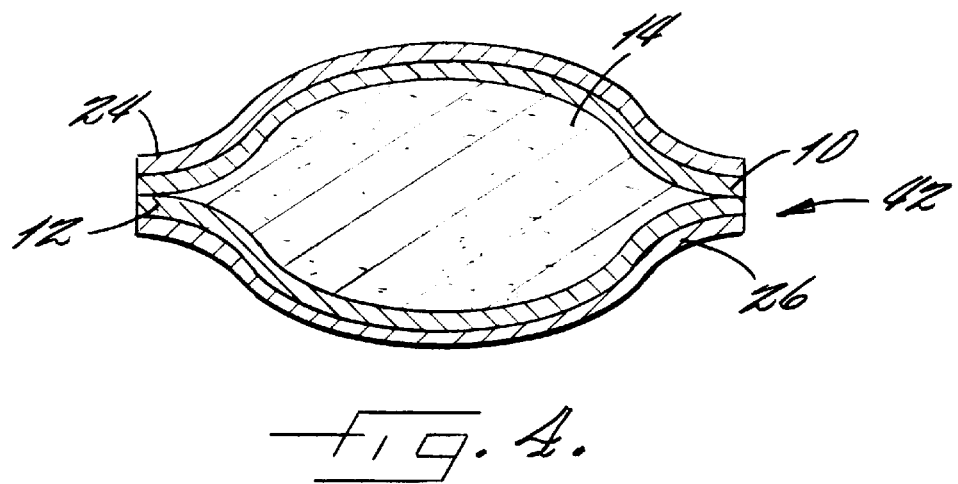
FIG. 4 is a cross-sectional view of a LDC part having a generally curved shape which is formed according to the invention.
Figure 5:
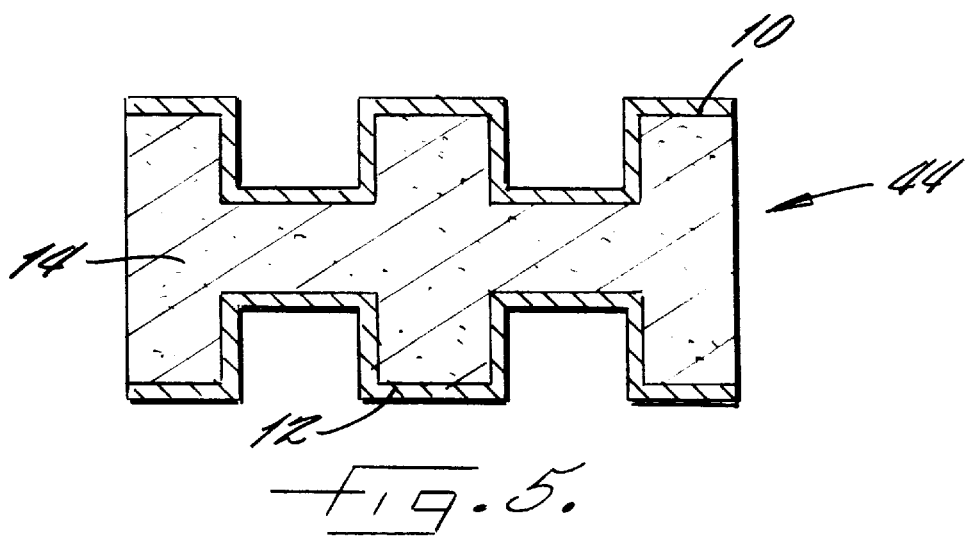
FIG. 5 is a cross-sectional view of a LDC part having a shape generally conforming to a sawtooth pattern which is formed according to the invention.

FIGS. 3–5 illustrate LDC metal parts 40, 42 and 44 formed according to the invention. As shown in these figures, the LDC parts 40, 42 and 44 generally include the porous, foam core 14, the first solid metal face sheet 10 bonded to one side of the core, and the second solid metal face sheet 12 bonded to the side of the core opposite that of the first face sheet 10. Preferably, the core 14 has a density of between about 30 and 50 percent of the density of the solid metal. As shown in FIG. 4, the LDC part 42 may further include additional face sheets 24 and 26 bonded to the face sheets 10 and 12, respectively. The additional face sheets 24 and 26 may be bonded to the face sheets 10 and 12 in the simultaneous pressure bonding and densification step or in a separate step, if so desired.

The method of forming low density core metal parts allows for a sound face sheet to foam core bond and sensitive control of the final core density thereby providing a desired bend strength:weight ratio for a particular application. A wide variety of final densities and part thicknesses may be achieved by altering the face sheet thickness, the initial foam thickness, the initial foam density, and the total forge reduction. The resulting LDC parts possess the advantages of both solid metal and sandwich metal structures, including a high degree of structural stability, without providing reinforcements in the core.

Advantageously, the method of forming low density core metal parts using a simultaneous pressure bonding and densification step provides a low cost and effective way to produce LDC parts. The resulting LDC metal parts may be used in various applications including the aerospace industry to provide parts which are buckling or crippling limited. The LDC parts are particularly useful for parts having thin cross-sections. For example, the LDC metal parts may be used for wing skins, flap skins, fuselage skins, bulkheads, wing carry-through structures, helicopter tailboom sections, and the like.

Many modifications and other embodiments of the invention will come to the mind of one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for forming low density core metal parts comprising:
   providing a porous, foam metal core;
   providing first and second solid metal face sheets having a particular shape, at least one of said face sheets being non-planar; and
   simultaneously pressure bonding said first and second solid metal face sheets directly to opposite sides of the core and densifying the core to correspond generally to the shape of the face sheets by applying heat and uniaxial forge pressure to the first and second face sheets and the core for a period of time to produce a metal part having a low density, porous care.

2. The method according to claim 1 wherein said providing step comprises providing a porous foam core comprising a material selected from the group consisting of aluminum and aluminum alloys.

3. The method according to claim 1 wherein said step of simultaneously pressure bonding the face sheets to the core and densifying the core comprises applying heat at a temperature of between about 350° C. and 500° C. and pressure at up to about 1 ksi for between about 5 and 60 minutes.

4. The method according to claim 2 wherein said step of simultaneously pressure bonding the face sheets to the core and densifying the core comprises pressure bonding first and second face sheets formed of a material selected from the group consisting of aluminum and aluminum alloys.

5. The method according to claim 1 wherein the core has an original thickness prior to the application of heat and pressure, and wherein the step of simultaneously pressure bonding the face sheets to the core and densifying the core comprises densifying the core to no more than about 50% of the original thickness.

6. The method according to claim 1 wherein said providing step comprises providing a core having a porosity of between about 75 and 95 percent.

7. The method according to claim 6 wherein the step of simultaneously pressure bonding the face sheets to the core and densifying the core comprises densifying the core to a porosity of between about 30 and 50 percent.

8. The method according to claim 1 further comprising the step of removing oxides and other contaminants from the first and second face sheets prior to pressure bonding the face sheets to the core.

9. The method according to claim 1 further comprising the step of removing oxides and other impurities from the core prior to pressure bonding the face sheets to the core.

10. The method according to claim 1 wherein said step of simultaneously pressure bonding the face sheets to the core and densifying the core comprises pressure bonding the face sheets to the core and densifying the core in a hot press evacuated to a pressure of less than about $10^{-6}$ torr.

11. The method according to claim 1 wherein said step of simultaneously pressure bonding the face sheets to the core and densifying the core comprises pressure bonding the face sheets to the core and densifying the core in a hot press in an inert environment.

12. The method according to claim 1 wherein said step of simultaneously pressure bonding the face sheets to the core and densifying the core comprises vacuum bagging the face sheets and the core in a steel envelope, placing the steel envelope in a hot forge, and simultaneously pressure bonding the face sheets to the core and densifying the core in the hot forge.

13. The method according to claim 1 wherein said step of simultaneously pressure bonding the face sheets to the core and densifying the core comprises providing a forming die having a shape and pressure bonding face sheets which correspond generally to the shape of the forming die to the core to form a low density core part having a shape that corresponds generally to the shape of the forming die.

14. A method for forming low density core aluminum or aluminum alloy parts comprising:
   providing first and second solid metal face sheets having a shape such that at least one of said face sheets is non-planar and providing a porous, foam core having an original thickness and a shape which corresponds generally to the shape of the face sheets, the core and face sheets comprising a material selected from the group consisting of aluminum and aluminum alloys;
   removing oxides and other impurities from the face sheets and the core to thereby facilitate bonding therebetween; and
   simultaneously pressure bonding first and second face sheets directly to opposite sides of the core and densifying the core to no more than about 50%, of the original thickness to, produce an aluminum or aluminum alloy part having a low density, porous core by applying heat at a temperature of between 350° C. and 500° C. and uniaxial forge pressure up to about 1 ksi to the first and second face sheets and to the core for between about 5 and 60 minutes.

* * * * *